Patented Feb. 6, 1951

2,540,794

UNITED STATES PATENT OFFICE 2,540,794

COPOLYMERS OF MALEIC ANHYDRIDE AND THIOPHENE COMPOUNDS

Ferdinand P. Otto, Woodbury, and Robert W. Barrett, Sewell, N. J., assignors to Socony-Vacuum Oil Company, Incorporated, a corporation of New York No Drawing. Application April 14, 1949, Serial No. 87,556

18 Claims. (Cl. 260—79.7)

This invention relates to polymeric materials and, more particularly, is directed to copolymers of thiophene and alkyl derivatives thereof with maleic anhydride.

It has heretofore been known from the work of Diels and Alder that it is possible to react maleic anhydride with certain hydro-aromatic hydrocarbons, such as phellandrene, to yield a crystalline reaction product. Furan, also, has been reported [Ber. 62, 564 (1929)] to react with maleic anhydride, forming a Diels-Alder adduct. It has further been reported in the literature by Delaby [Bull. Soc. Chim. (5) 4, 765 (1937)] that thiophene does not react with maleic anhydride in formation of a Diels-Alder product.

In accordance with the present invention, it has now been discovered that thiophene and alkylthiophenes may be reacted with maleic anhydride under conditions described hereinafter to yield a valuable copolymeric composition. The products so obtained differ essentially from the aforementioned compositions of Diels and Alder in that they are amorphous and retain their amorphous state under conditions which generally induce crystallization. Moreover, molecular weight determinations of the compositions of this invention clearly indicate that the copolymers described herein are of considerably higher molecular weight than would be expected from a simple Diels-Alder adduct.

It has now been found that thiophene and its alkyl derivatives may be copolymerized with maleic anhydride in the presence of an organic peroxide catalyst to yield a new and useful copolymeric material.

It is an object of the present invention to provide a method for effecting the copolymerization of thiophene and alkyl thiophenes with maleic anhydride. A further object is the production of a new copolymer of thiophene and alkyl thiophene with maleic anhydride. A still further object is a method for obtaining these new copolymers in high yield. Other objects and advantages of this invention will appear hereinafter.

The above objects are accomplished by the method described herein, in which reaction between thiophene or alkyl thiophene and maleic anhydride is carried out in the presence of an organic peroxide catalyst. Preferably, but not essentially, the copolymerization reaction is effected in the presence of an inert organic diluent.

The thiophene-maleic anhydride and alkyl thiophene-maleic anhydride copolymers of this invention are fine powders, light brown in color. They are soluble in acetone, methyl ethyl ketone, dioxane and ethyl acetate, and insoluble in the aromatic hydrocarbons, such as benzene, toluene, ethyl benzene, and xylene. They are neutralized by dilute aqueous caustic, forming salts of the alkalies which are readily soluble in water. They can be esterified with monohydric or polyhydric alcohols and may be amidated by reaction with primary, secondary, or tertiary amines. The copolymer acid may be formed by alkaline hydrolysis of the copolymer, followed by neutralization and recovery. The copolymer acid is water-soluble, incompletely soluble in acetone, retains all of the sulfur originally held by the copolymer anhydride and responds to esterification more readily than the copolymer anhydride.

The copolymers of maleic anhydride and thiophene or alkyl thiophene are prepared in the presence of an organic peroxide, such as benzoyl peroxide, acetyl peroxide, lauroyl peroxide, tertiary butyl hydroperoxide, butyryl peroxide, or succinyl peroxide. Generally, maleic anhydride, thiophene or alkyl thiophene, and an inert solvent are heated to reflux and the peroxide catalyst is added. The reaction is normally carried out with equimolar quantities of reactants, since the monomers of thiophene or alkyl thiophene and maleic anyhdride react in approximately a 1 to 1 ratio regardless of the initial proportions of monomers used. If either monomer is present in the reaction mixture in appreciable excess of a 1 to 1 molar ratio, the excess may be recovered almost quantitatively. In order to obtain the highest yield of copolymer, it is advantageous to add the organic peroxide catalyst slowly to the reaction mixture throughout the polymerization period.

The copolymeric reaction product precipitates from the reaction mixture as a brown resinous material which remains a viscous liquid at reaction temperature but quickly hardens upon cooling. The unreacted liquid fraction is removed from the reaction product. The crude copolymer of maleic anhydride-alkyl thiophene is purified by dissolving in a suitable solvent, such as acetone, and then precipitating from solution by pouring into an excess of methanol. The precipitate so formed is removed by filtration and dried to a light brown amorphous powder. The copolymer of maleic anhydride-thiophene is purified preferably by leaching the pulverized product with boiling toluene and drying. The copolymers of this invention are characterized by a molecular weight within the approximate range of 1,000 to 12,000 as determined by the osmotic pressure method described in Industrial and Engineering Chemistry (Analytical Edition) volume 19, page 261 (1947).

The present process is operable at relatively low temperature, which may be as low as 50° C. Preferably, the temperature used will be within the approximate range of 80° C. to 150° C. although the process is not inoperative at higher temperatures. The process is generally, but not essentially, carried out in the presence of an inert solvent, such as toluene or xylene and at the reflux temperature thereof. The application of pressure, although not precluded, is generally unnecessary in the present process. Ordinarily, a reaction time of between about 2 and about 5 hours is required to effect the desired copolymerization reaction.

Analyses of the thiophene-maleic anhydride copolymer show a maleic anhydride content of from 47 to 50 per cent by weight, indicating that the reactants are combined in substantially equimolar amounts. Infra-red spectrum analyses show the presence of both anhydride (C=C) and aliphatic (C=C) functional groups. The thiophene-maleic anhydride copolymers are accordingly believed to have the repeating structure unit indicated in the formula:

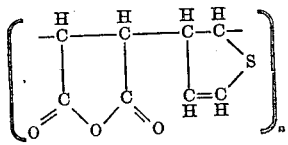

where $n$ has a value of at least 5 and may be as high as 60, or even higher.

The following examples will serve to illustrate the process of this invention without limiting the same.

Example I

Two hundred and fifty-two grams (3 moles) of thiophene, 294 grams (3 moles) of maleic anhydride, and 300 milliliters of toluene were placed in a 4-necked round bottom flask containing a reflux condenser, thermometer, and mechanically driven stirrer. After heating to the reflux temperature of 100–105° C., 30 grams of benzoyl peroxide were added in 6 equal portions at ½-hour intervals, and the reaction mixture was held at reflux temperature of 114–116° C., with agitation, for a period of ½ hour after the last catalyst addition, bringing the total reaction time to 3 hours. The copolymer precipitated steadily as a resinous liquid. After cooling the reaction mixture to room temperature, the liquid layer was separated from the hard resinous product by decantation. The cold polymer was pulverized and leached with boiling toluene. The grinding-leaching operation was twice repeated to insure complete removal of unreacted maleic anhydride and thiophene. After drying, the yield of product, a light tan powder, amounted to 275 grams or 50.5 per cent theoretical yield. The product was a copolymer of maleic anhydride and thiophene combined in substantially equimolar amounts, as shown by the following analysis:

| | Found | Calc'd [1] |
|---|---|---|
| Sulfur ----------------------------per cent-- | 14.07 | 17.58 |
| Carbon ----------------------------------- | 54.26 | 52.75 |
| Hydrogen --------------------------------- | 4.11 | 3.29 |
| Oxygen ----------------------------------- | 27.56 | 26.37 |
| Neutralization Number --------------------- | 580 | 615 |
| Maleic Anhydride ----------------per cent-- | 51 | 53.8 |
| Mol. Weight (osmotic pressure method) ----- | 6,000 | -------- |

[1] Based on a 1:1 polymer.

Example II

Two hundred grams of 3-methylthiophene, 98 grams of maleic anhydride, and 150 milliliters of toluene were placed in a 4-necked round bottom flask containing a reflux condenser, thermometer, and mechanically driven stirrer. After heating the mixture to the reflux temperature of 114–116° C., the addition of 8 grams of a commercial product containing 63 per cent by weight of tertiary butyl hydroperoxide was made in 10 equal portions at ½-hour intervals, the total reaction time being 5 hours. The resulting reaction product was a light brown, toluene-insoluble resinous composition, which was isolated from the unreacted liquid fraction by decantation and then dissolved in acetone. This solution was then poured into methanol to precipitate the copolymer which, after filtration and drying, weighed 133 grams (67 per cent of the theoretical yield). The product was a copolymer of maleic anhydride and 3-methylthiophene combined in substantially equimolar amounts, as shown by the following analysis:

| | Found | Calc'd [1] |
|---|---|---|
| Sulfur ----------------------------per cent-- | 13.95 | 16.32 |
| Carbon ----------------------------------- | 52.60 | 55.11 |
| Hydrogen --------------------------------- | 5.10 | 4.08 |
| Oxygen ----------------------------------- | 28.35 | 24.49 |
| Neutralization Number --------------------- | 419 | 563 |
| Maleic Anhydride ----------------per cent-- | 36.9 | 50 |
| Mol. Weight (osmotic pressure method) ----- | 7,500 | -------- |

[1] Based on a 1:1 copolymer.

Example III

Forty-nine grams of 2-methylthiophene, 49 grams of maleic anhydride, and 50 grams of toluene were placed in a 4-necked round bottom flask containing a reflux condenser, thermometer, and mechanically driven stirrer. After heating the mixture to the reflux temperature of 107–110° C., the addition of 2.7 grams of benzoyl peroxide was made in 10 equal portions at ½-hour intervals, the total reaction time being 5 hours. During the reaction, a polymeric product deposited around the sides of the flask and on the stirrer blades in the form of a soft orange-brown resinous composition. After cooling, the liquid reaction mixture was separated from the resinous product by decantation. The residue product was dissolved in acetone and this solution was poured into methanol to precipitate the copolymer. The resulting copolymeric product was a fine, light tan powder when dry and was composed of maleic anhydride and 2-methylthiophene combined in substantially equimolar amounts as shown by the following analysis:

| | Found | Calc'd [1] |
|---|---|---|
| Sulfur ----------------------------per cent-- | 14.86 | 16.32 |
| Carbon ----------------------------------- | 53.56 | 55.11 |
| Hydrogen --------------------------------- | 4.09 | 4.08 |
| Oxygen ----------------------------------- | 27.59 | 24.49 |
| Neutralization Number --------------------- | 498 | 563 |

[1] Based on a 1:1 copolymer.

Example IV

One hundred forty-one grams of 2-tertiary butylthiophene, 98 grams of maleic anhydride and 100 milliliters of toluene were placed in a 4-necked round bottom flask containing a reflux condenser, thermometer, and mechanically driven stirrer. After heating the mixture to 110° C., the addition of 7.2 grams of benzoyl peroxide was made in 10 equal portions at ½-hour intervals, the total reaction time being 5 hours. The polymeric product that formed during the reaction remained in solution at the reaction temperature but tended to settle out of solution at room temperature, together with unreacted crystalline maleic anhydride. Water was added to the above reaction mixture and the whole was agitated in a separatory funnel. On standing, three layers were formed. The lower viscous layer was dissolved in acetone and was thereafter thrown out of solution by the addition of the acetone solution to benzene. The precipitated material was filtered and dried to give a fine, light yellow powder which was a copolymer of maleic anhydride and 2-tertiary butylthiophene combined in substantially equimolar amounts, as shown by the following analysis:

|  | Found | Calc'd [1] |
|---|---|---|
| Sulfur........per cent.. | 11.41 | 13.40 |
| Carbon.......... | 57.40 | 60.7 |
| Hydrogen.......... | 6.66 | 6.27 |
| Oxygen.......... | 24.53 | 19.63 |

[1] Based on a 1:1 copolymer.

The following examples were carried out under reaction conditions of time, temperature, and mode of catalyst addition essentially the same as those employed in Example I:

oxane, xylene, methyl ethyl ketone, and the like. Of the above solvents, toluene was found to be the most satisfactory reaction medium on the basis of color of the product, maintenance of proper fluidity without local overheating and on the yield of copolymer obtained.

Organic peroxides soluble in organic solvents may be used as a catalyst for the present copolymerization reaction. Such peroxides include benzoyl peroxide, acetyl peroxide, tertiary butyl hydroperoxide, butyryl peroxide, succinyl peroxide, lauroyl peroxide, and methylcyclohexyl hydroperoxide. Of the above list, benzoyl peroxide, tertiary butyl hydroperoxide and methylcyclohexyl hydroperoxide are preferred catalysts for the preparation of the thiophene-maleic anhydride copolymer. However, for the alkylated thiophene-maleic anhydride copolymers, improved yields are obtained with the hydroperoxides. The organic peroxide catalyst is generally used in an amount between about 0.5 and about 10 per cent by weight and preferably in an amount between about 1 and about 6 per cent by weight.

The present invention contemplates copolymerization of maleic anhydride and thiophene or alkyl thiophene to yield a useful copolymeric material. Of the alkyl thiophenes, the monosubstituted derivatives of short chain length, such as methyl thiophene, ethyl thiophene, propyl thiophene, butyl thiophene, and the like, are preferred, although useful resinous products are

| Ex. No. | Reactants | | | | Solvent | Catalyst | | | | Yield of Product | | Analysis of Product | |
|---|---|---|---|---|---|---|---|---|---|---|---|---|---|
| | Thiophene | | Maleic Anhydrate | | | Composition | Grams | Mol | Weight per cent of Reactants | Grams | Per cent of Theor. | Percent Sulfur | N. N. |
| | Grams | Mols | Grams | Mols | | | | | | | | | |
| V...... | 42.0 | 0.50 | 49.0 | 0.50 | Toluene, 50 ml. | Benzoyl Peroxide.......... | 0.9 | .0037 | 1.0 | 10 | 11.0 | 15.74 | 610 |
| VI..... | 252.0 | 3.0 | 294.0 | 3.0 | Toluene 300 ml. | .....do................ | 15.0 | .062 | 2.75 | 133 | 24.3 | 13.45 | 592 |
| VII.... | 252.0 | 3.0 | 294.0 | 3.0 | .....do..... | .....do................ | 30.0 | .124 | 5.50 | 268 | 49.2 | 13.92 | 577 |
| VIII... | 42.0 | 0.50 | 49.0 | 0.5 | Toluene, 50 ml. | .....do................ | 9.1 | .038 | 10.0 | 35 | 38.5 | 15.39 | 554 |
| IX..... | 42.0 | 0.50 | 49.0 | 0.5 | Xylene, 50 ml. | .....do................ | 5.0 | .0207 | 5.50 | 40 | 44.0 | 15.27 | 540 |
| X...... | 84.0 | 1.0 | 98.0 | 1.0 | Toluene, 100 ml. | Methylcyclohexyl Hydroperoxide in 60% concentration in Methylcyclohexyl Alcohol. | 12.8 | .098 | 7.04 | 81 | 44.5 | 12.27 | 396 |
| XI..... | 42.0 | 0.50 | 98.0 | 1.0 | Toluene, 100 ml. | Benzoyl Peroxide.......... | 7.7 | .0318 | 5.50 | 62 | 68.2 | 13.33 | 600 |
| XII.... | 84.0 | 1.0 | 49.0 | 0.5 | None..... | .....do................ | 5.0 | .0207 | 3.73 | 31 | 34.1 | 14.54 | 580 |

Examples V, VI, VII, and VIII show the effects of varying amounts of peroxide catalyst as related to the yields of products obtained. In Example IX, xylene was used as the solvent medium, while in Example X, a catalyst of methylcyclohexyl hydroperoxide in 60 per cent concentration in methylcyclohexyl alcohol was used as the copolymerization catalyst. When excess maleic anhydride was used, as illustrated in Example XI, the product obtained analyzed substantially the same as those obtained by using a 1:1 mole ratio of reactants. The yield of product, however, was slightly increased by this procedure. In Example XII, no solvent medium was employed other than that resulting from the use of excess thiophene. The reaction, however, is preferably carried out in the presence of a solvent. Materials suitable for use as solvents should preferably boil at a temperature above 70° C., be inert to reactants, and be readily separated from the product. Among such materials are benzene, toluene, diobtained upon reaction of maleic anhydride and alkyl thiophenes having comparatively long alkyl substituents.

The properties of the present copolymers of maleic anhydride and thiophene or its alkyl derivatives may be modified by including in the reaction third components, capable of being incorporated into the polymerization product, consisting of polymerizable vinyl compound such as styrene or methyl methacrylate.

The polymers obtained in accordance with this invention are useful as textile treating agents, tanning agents, protein hardeners, photographic chemicals, gelatin substitutes, petroleum chemicals, and alkyd resin ingredients.

We claim:

1. A copolymer of maleic anhydride and a material from the group consisting of thiophene and monoalkyl thiophenes in which the reactants are combined in substantially equimolar amounts.

2. A copolymer of maleic anhydride and thiophene in which the reactants are combined in substantially equimolar amounts.

3. A copolymer of maleic anhydride and a monoalkyl thiophene in which the reactants are combined in substantially equimolar amounts.

4. A copolymer of maleic anhydride and methylthiophene in which the reactants are combined in substantially equimolar amounts.

5. A copolymer of maleic anhydride and tertiary butylthiophene in which the reactants are combined in substantially equimolar amounts.

6. A process for producing a copolymer of maleic anhydride and a material selected from the group consisting of thiophene and monoalkyl thiophenes in which the reactants are combined in substantially equimolar amounts, which comprises reacting maleic anhydride and a material selected from the group consisting of thiophene and monoalkyl thiophenes at a temperature greater than about 50° C. in the presence of an organic peroxide catalyst.

7. A process for producing a copolymer of maleic anhydride and a material selected from the group consisting of thiophene and mono alkyl thiophenes in which the reactants are combined in substantially equimolar amounts, which comprises reacting maleic anhydride and a material selected from the group consisting of thiophene and mono alkyl thiophenes at a temperature greater than about 50° C. in the presence of an inert organic solvent and an organic peroxide catalyst.

8. A process for producing a copolymer of maleic anhydride and thiophene, in which the reactants are combined in substantially equimolar amounts, which comprises reacting maleic anhydride and thiophene at a temperature greater than about 50° C. in the presence of an organic peroxide catalyst.

9. A process for producing a copolymer of maleic anhydride and methylthiophene, in which the reactants are combined in substantially equimolar amounts, which comprises reacting maleic anhydride and methylthiophene at a temperature greater than about 50° C. in the presence of an organic peroxide catalyst.

10. A process for producing a copolymer of maleic anhydride and tertiary butylthiophene, in which the reactants are combined in substantially equimolar amounts, which comprises reacting maleic anhydride and tertiary butylthiophene at a temperature greater than about 50° C. in the presence of an organic peroxide catalyst.

11. A process for producing a copolymer of maleic anhydride and thiophene, in which the reactants are combined in substantially equimolar amounts, which comprises reacting maleic anhydride and thiophene at a temperature greater than about 50° C. in the presence of an inert organic solvent and a catalyst of benzoyl peroxide.

12. A process for producing a copolymer of maleic anhydride and thiophene, in which the reactants are combined in substantially equimolar amounts, which comprises reacting maleic anhydride and thiophene at a temperature greater than about 50° C. in the presence of an inert organic solvent and a catalyst of methylcyclohexyl hydroperoxide.

13. A process for producing a copolymer of maleic anhydride and 3-methylthiophene, in which the reactants are combined in substantially equimolar amounts, which comprises reacting maleic anhydride and 3-methylthiophene at a temperature greater than about 50° C. in the presence of an inert organic solvent and a catalyst of tertiary butyl hydroperoxide.

14. A process for producing a copolymer of maleic anhydride and 2-tertiary butylthiophene, in which the reactants are combined in substantially equimolar amounts, which comprises reacting maleic anhydride and 2-tertiary butylthiophene at a temperature greater than about 50° C. in the presence of an inert organic solvent and a catalyst of benzoyl peroxide.

15. A process for producing a copolymer of maleic anhydride and a material selected from the group consisting of thiophene and mono alkyl thiophenes, in which the reactants are combined in substantially equimolar amounts, which comprises slowly adding an organic peroxide catalyst over a reaction period of from about 2 to about 5 hours to a mixture of maleic anhydride and a material selected from the group consisting of thiophene and mono alkyl thiophenes maintained at a temperature of between about 80° C. and about 150° C., and thereafter separating the resulting resinous copolymeric product formed from the liquid reaction mixture.

16. A process for producing a copolymer of maleic anhydride and a material selected from the group consisting of thiophene and mono alkyl thiophenes, in which the reactants are combined in substantially equimolar amounts, which comprises slowly adding an organic peroxide catalyst over a reaction period of from about 2 to about 5 hours to a mixture of maleic anhydride, an inert organic solvent and a material selected from the group consisting of thiophene and mono alkyl thiophenes maintained at a temperature of between about 80° C. and about 150° C., and thereafter separating the resulting resinous copolymeric product formed from the liquid reaction mixture.

17. A process for producing a copolymer of maleic anhydride and a material selected from the group consisting of thiophene and mono alkyl thiophenes, in which the reactants are combined in substantially equimolar amounts, which comprises slowly adding an organic peroxide catalyst over a reaction period of from about 2 to about 5 hours to a mixture of maleic anhydride and a material selected from the group consisting of thiophene and mono alkyl thiophenes maintained at a temperature of between about 80° C. and about 150° C., the total quantity of said added catalyst being such that it is present in an amount of between about 0.5 and about 10 per cent by weight of the reaction mixture, and thereafter separating the resulting resinous copolymeric product formed from the liquid reaction mixture.

18. A process for producing a copolymer of maleic anhydride and 2-methylthiophene, in which the reactants are combined in substantially equimolar amounts, which comprises reacting maleic anhydride and 2-methylthiophene at a temperature greater than about 50° C. in the presence of an inert organic solvent and a catalyst of benzoyl peroxide.

FERDINAND P. OTTO.
ROBERT W. BARRETT.

REFERENCES CITED

The following references are of record in the file of this patent:

UNITED STATES PATENTS

| Number | Name | Date |
| --- | --- | --- |
| 2,453,085 | Caesar | Nov. 2, 1948 |
| 2,453,086 | Caesar | Nov. 2, 1948 |

Certificate of Correction

Patent No. 2,540,794                                                     February 6, 1951

FERDINAND P. OTTO ET AL.

It is hereby certified that error appears in the printed specification of the above numbered patent requiring correction as follows:

Column 1, line 10, for "62,564" read *62,554*; columns 5 and 6, Example XII, under the heading "Weight per cent of Reactants", last line thereof, for "3.73" read *3.76*; column 7, line 10, for "hutylthiophene" read *butylthiophene*; and that the said Letters Patent should be read as corrected above, so that the same may conform to the record of the case in the Patent Office.

Signed and sealed this 12th day of June, A. D. 1951.

[SEAL]

THOMAS F. MURPHY,
*Assistant Commissioner of Patents.*